F. J. LaForme.

Nursing-Bottle.

No 2831 Reissued Jan. 14, 1868.

Witnesses

F. P. Hale

Arthur Neile

Inventor

F. J. LaForme

United States Patent Office.

MILO S. BURR, OF BOSTON, MASSACHUSETTS, ASSIGNEE BY MESNE ASSIGNMENTS OF FRANCIS J. LA FORME.

*Letters Patent No.* 26,327, *dated November* 29, 1859; *reissue No.* 2,831, *dated January* 14, 1868.

IMPROVEMENT IN NURSING-BOTTLES.

The Schedule referred to in these Letters Patent and making part of the same.

TO ALL PERSONS TO WHOM THESE PRESENTS MAY COME:

Be it known that, whereas, FRANCIS J. LA FORME, of Boston, in the county of Suffolk, and State of Massachusetts, did invent a new and useful Improvement in Nursing-Bottles, for which Letters Patent were granted to him on the 29th day of November, A. D. 1859; and whereas, I, MILO S. BURR, of said Boston, by mesne assignments, have become the sole owner of the said invention and Letters Patent; and whereas, I believe the said patent is not fully valid and available to me, by reason of a defective specification and claim, and that the said error has occurred through inadvertence, accident, or mistake; and whereas, I am desirous of having the same corrected; now, therefore, I do hereby declare the said invention to be fully set forth in the following specification, reference being had to the accompanying drawings, making a part thereof. Of such drawings—

Figure 1:
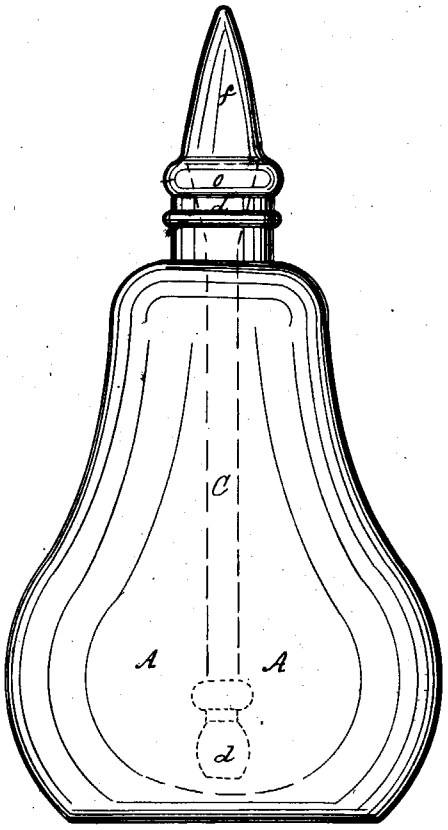

Figure 1 denotes a side elevation of a nursing-bottle constructed in accordance with my invention.

Figure 2:
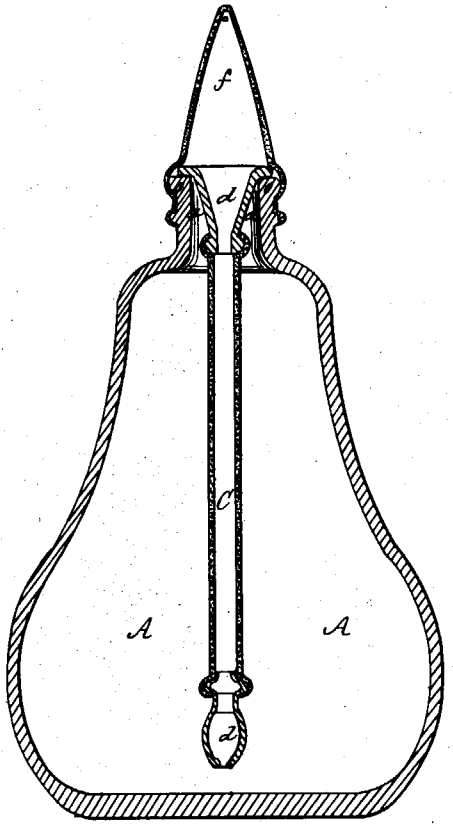

Figure 2 is a vertical and central section thereof.

In carrying out my invention, as shown in the drawings, I take a glass bottle, A, of any convenient form, the same having a mouth, *a*, of suitable size, and a small flange, *o*, around such mouth, for the object of securing the gum-elastic nipple, *f*, thereto when drawn over the neck of the bottle, as seen in figs. 1 and 2.

The nature of my invention consists mainly in applying to a nursing-bottle, and so as to extend down from the mouth, neck, or stopper thereof, and into the interior of the said bottle, a flexible or pendulous tube, whereby the nutriment contained in such bottle can not only be drawn out of the same, with equal facility, in whatever position the bottle may be placed, but the child or infant using such bottle be prevented from inhaling air therefrom instead of nutriment.

It is a fact well known to physicians and nurses, or those having the care of infants, (forced by necessity or otherwise, to derive their nourishment from other than their natural sources,) that a good, cleanly, and substantial nursing-bottle has been a desideratum that has long existed. To supply this need, various devices or bottles have been invented. Some of these have been constructed entirely of metal, which, owing to its oxidation, renders it totally unfit for such purpose, for milk or other fluid being placed in them, and suffered to remain for a short time, causes oxidation to take place on the inside of the bottle. Such not being seen, is often suffered to remain, to the great injury of the child using such bottle. Others have been made with a glass body and a metallic cap, and with a metallic tube extending down into the interior of the bottle. These are also objectionable, owing to the difficulty of keeping such metallic parts from oxidation. Others still have been made entirely of glass, with the exception of the stopper and the rubber nipple. The evil incident to the latter bottle is the great difficulty of cleaning its bent eduction-tube without breakage thereof, and, moreover, another serious disadvantage, which all these last-mentioned bottles possess, arises from the inflexible bent form of their eduction-tubes, the same rendering it indispensable that each bottle should be held in a certain fixed position, viz, so that the mouth or lower end of its eduction-tube should always stand downward, in order to prevent the child or infant from inhaling air, and to enable it to obtain the liquid contents of the bottle. By my improvement I have remedied all the above defects.

In order to render it easy for the child to draw nourishment from the bottle, (when supplied therewith,) and make it impossible for him to inhale air therefrom, in whatever position the bottle may be, instead of nourishment, I dispose within the bottle a flexible or pendulous tube, or conduit C. For the purpose of maintaining the said tube in the proper position with respect to the mouth of the bottle, I attach the upper part of such tube to the shank or lower portion of a tubular supporter, *d*. The said part, *d*, I usually construct of glass; but it may be made of any other non-corrosive material suitable for the purpose. The said supporter I construct of a tapering form, and with its larger base or end of a diameter equal or about equal to the diameter of the mouth *a* of the bottle, and I form an annular flange, around its upper part, to abut or rest on the outer end or walls of the mouth, as shown in fig. 2.

Another mode of supporting the said flexible tube would be to insert a plug or stopper in the neck of the bottle, and provide such stopper with a hole extending axially through it, such hole having a diameter equal to or a little greater than that of the flexible conduit C, which may extend into or through it. The said tube C, I make of India rubber, or its equivalent, and of such a length that it and the glass tip or tube *e*, appended to the lower portion thereof, may extend nearly to the bottom of the bottle, when such bottle may be in a vertical position, as shown in the drawings. The said tip *e*, near its upper end, is formed with a circular enlargement, of such diameter that, when the elastic tube is stretched over the same, the glass tip shall be prevented from striking against the interior surface of the bottle with such force as to do injury thereto. Or, instead of making the tip of this peculiar shape, if preferable, such tip or tube may be made as a plain cylinder, of glass, or other non-corrosive material, and a narrow India-rubber annulus, or its equivalent, be disposed concentrically around such cylinder, at or near its lower end. The said lower tip or tube *e* may be of greater or less length, as may be desirable, provided it have sufficient gravitating force to maintain the lower end of the eduction-tube within the liquid in the bottle, until such liquid may become exhausted.

I claim my said improved nursing-bottle, having its body A composed of glass or other suitable material, and provided with an elastic nipple or mouth-piece, *f*, and a flexible or pendulous tube, C, applied thereto, substantially in manner and so as to operate as and for the purpose set forth.

I also claim, in a nursing-bottle, otherwise properly organized, the use or application of a flexible or pendulous tube, substantially as and for the purpose set forth.

I also claim the application of a gravitating tip or tube, *e*, to the lower end of the flexible tube C, substantially as and for the purpose set forth.

MILO S. BURR.

Witnesses:
HIRAM KNAPP,
D. G. BURR.